Sept. 1, 1959  E. J. POLTORAK  2,902,305
GASKETS AND METHOD OF MAKING THE SAME
Filed July 22, 1954
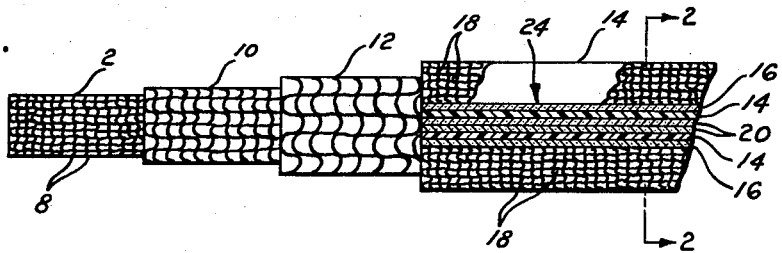
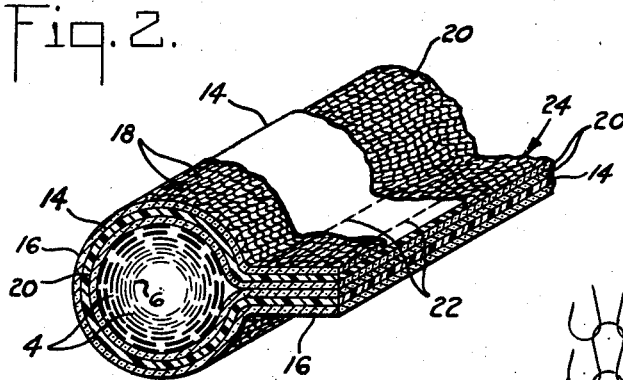
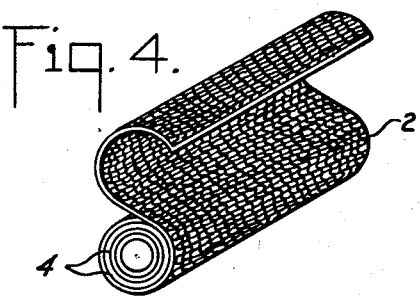
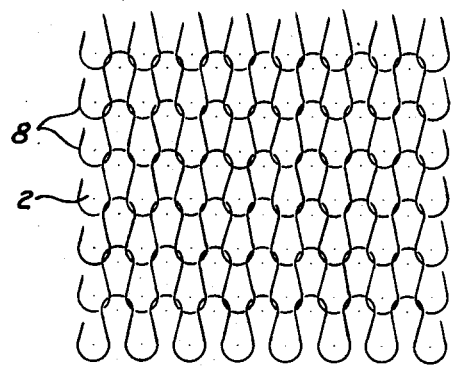
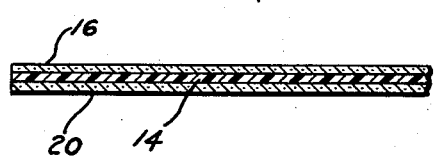
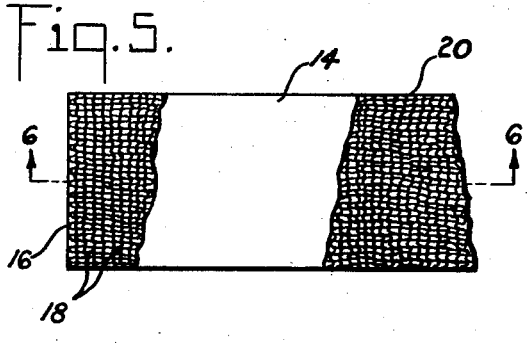
INVENTOR.
EMIL J. POLTORAK
BY Virgil C Kline
ATTORNEY:

United States Patent Office 2,902,305
Patented Sept. 1, 1959

2,902,305

GASKETS AND METHOD OF MAKING THE SAME

Emil J. Poltorak, Somerville, N.J., assignor to Johns-Manville Corporation, New York, N.Y., a corporation of New York Application July 22, 1954, Serial No. 445,141

7 Claims. (Cl. 288—11)

This invention relates to gaskets, and in particular to improvements in gaskets for services requiring sealing against corrosive liquids and gases at relatively high temperatures, especially such gaskets having a shape as generally illustrated in E. J. Wirfs U.S. Patent No. 1,533,490, issued April 14, 1925.

Various attempts have been made to develop gaskets having the properties requisite for sealing against corrosive fluids at elevated temperatures, but known gaskets for this purpose have not generally exhibited the desired combined properties of ready compressibility under light sealing forces, good sealing effectiveness over a long service life, and good flexibility and resilience or tendency to recover from compression loads. In U.S. patent application Serial No. 438,997, filed June 24, 1954, in the name of Emil J. Poltorak and Walter M. DeWitt, Sr., there is disclosed a gasket which exhibits substantially all of these desired properties, including good resistance to corrosion, but not intended particularly to withstand the corrosive action of practically all chemicals. Another such gasket is disclosed in U.S. patent application Serial No. 441,014, filed July 2, 1954, in the name of Emil J. Poltorak and Donald H. Johns, the gasket therein disclosed being adapted to withstand extremely high temperatures, in the neighborhood of 2000° F. and above, but also not intended to be capable of withstanding corrosion by substantially all chemicals. It is desirable to provide a gasket of the type described which is resistant to corrosion by substantially all fluids, at elevated temperatures ranging up to about 600° F., but prior to the instant invention, the problem of how to obtain the combined properties mentioned above in a gasket for this service has not been satisfactorily solved.

Accordingly, it is an object of the instant invention to provide a gasket which is readily compressed, which seals effectively, which is flexible and able to follow the relative motion of the surfaces to be sealed, which at the same time has a high degree of resilience, and, if desired, can be formed of materials which will withstand the corrosive action of substantially all fluids and reasonably high temperatures over a long service life without material loss of its sealing effectiveness.

It is a further object of the invention to provide a simple method of making such a gasket.

Broadly, my invention comprises gasketing having a resilient, flexible, compressible core, preferably a core formed in the manner described in the said pending applications Serial No. 438,997 and Serial No. 441,014, in which a strip of fabric knitted from metallic strands is rolled laterally, in relatively loose fashion, into superposed convolutions to form a center, about which is applied a jacket comprising one or more layers of fabric also knitted from metallic strands. About such a core, I apply a flexible cover comprising a plastic sheet of polymeric sealing material and a separate flexible layer of metallic fabric outwardly of the sealing material. Preferably, there is also a layer of metallic fabric inwardly of the plastic sealing material. It is highly preferred that the metallic fabric employed be a mesh knitted from metallic strands, of a gauge falling within a certain range and knitted with a number of courses per inch satisfying a particular range. In a more particular aspect, the invention includes the relating of the wire gauge and closeness of knit of the metallic mesh employed in the cover to that of the outer layer of the jacket of the type of core described above, in which the metallic strands also have initial diameters falling within certain size ranges, and knitted so as to have a number of courses per inch falling within a particular range. The invention comprises further the use of a corrosion- and relatively high heat-resistant sealing material which may be subject to rupture when employed in the thicknesses required to produce the desired flexibility. The invention also includes a method of making the specific preferred embodiment of my novel gasket.

The nature of the invention, and other objects and results thereof, and the manner of accomplishing the various objects, will be more clearly understood from the following detailed description, taken in connection with the accompanying drawing, in which:

Fig. 1 is an elevation showing a portion of a novel gasket of the instant invention, with certain elements broken away in part and with others shown in section;

Fig. 2 is a perspective view of the gasket of Fig. 1, taken on the section line 2—2 and looking in the direction of the arrows, but showing the core elements schematically, and showing certain portions of the cover material partially broken away;

Fig. 3 is a detail plan view on an enlarged scale, illustrating a knitted metal mesh fabric such as employed in the core and cover;

Fig. 4 is a perspective view showing how such a knitted metal mesh fabric may be rolled upon itself to form the center, the convolutions being shown schematically;

Fig. 5 is a plan view of the cover material illustrated in Fig. 1, with certain layers thereof broken away in part; and, Fig. 6 is a sectional view taken on the line 6—6, showing the layers of material comprising the cover illustrated in Fig. 5.

In accordance with the invention, a resilient, flexible, compressible gasket core is fashioned, preferably from all metallic components. In the highly preferred embodiment of the invention, the core is made in a manner disclosed in the above-mentioned copending applications. In forming such a core, a strip of knitted metal mesh fabric 2, of suitable width, depending upon the diameter of the gasket core to be formed, is rolled laterally into superposed convolutions 4 to form a center 6 for the gasket core. The strip of fabric knitted from metallic strands may be cut from a tubular knitted metal mesh stocking, as produced by conventional knitting machinery employed in the metal textile industry, the stocking being flattened, so that the strip as employed desirably, but not necessarily, comprises two layers of the fabric. It is preferable to crimp the strip before rolling it into the convoluted form. Very effective results are obtained by crimping the fabric strip lightly diagonally thereof, in a manner difficult to show, but intended to be illustrated by the wavy lines depicting certain of the strands of the fabric 2 in Fig. 1, and by not rolling the strip too tightly, so that the convolutions are relatively loosely related, with at least some of the crimps of successive convolutions interlocking. If desired, the central opening of the center 6 of the described construction may be filled by rolling within it one or more such centers, or by using a wider center strip and additional convolutions thereof, with the result, however, that a certain amount of the highly desired ready initial compressibility is thereby sacrificed.

The metallic strands 8 employed in the fabric 2 are preferably knitted about 8–20 courses per inch, and have an initial diameter within the range of about .003–.008 inch. The terminology, "initial diameter," is used in this application as an inclusive term to identify not only strands having a circular cross-section, but also strands having initially a circular cross-section but which may have been flattened or otherwise distorted in cross-sectional shape as employed in the various components of the gaskets.

Surrounding the center formed as described above, is a jacket comprising at least one layer of fabric knitted from metallic strands. Conveniently, the jacket comprises a tubular knitted metallic mesh stocking as shown at 10 having its inner surface in contact with the center and holding it under relatively light compression in its convoluted form. Preferably, a plurality of such jackets are applied, one over the other and in relatively light compressive contact with each other. One such additional jacket is illustrated at 12. For successful results, the strands employed in the jacket or jackets should be knitted about 4–12 courses per inch, and should have an initial diameter within the range of about .004–.020 inch. Effective results have been obtained by employing somewhat coarser strands and a more open knit in the outer jacket 12 than in the inner jacket 10 as illustrated, but this is not necessary, so long as the stated ranges of strand size and number of courses per inch are satisfied. In general, it is preferred that the jackets 10, 12, in a given gasket, be knitted from heavier gauge wire, and with a coarser mesh, than the fabric 2 forming the center strip 6.

As shown in detail in Figs. 5 and 6, the novel cover of the gasket of the instant invention comprises a flexible sheet of polymeric sealing material 14, and a separate flexible layer of metallic fabric, preferably a mesh 16 knitted from metallic strands 18, about 7–18 courses per inch, having an initial diameter within the range of about .003–.010 inch. The metallic fabric 16 is disposed outwardly of the polymeric sealing material 14, as applied to the gasket core. It is highly preferred to provide a metallic fabric 20, desirably identical with the metallic mesh 16, inwardly of the polymeric sealing material, as applied to the gasket core. The cover material may be fashioned in simple manner by flattening a tubular mesh stocking knitted from metallic strands, the conventional product of a commercial metal textile knitting machine, to provide adjacent layers of the knitted metallic mesh, and by then inserting a strip of the polymeric sealing material between the layers. The three separate layers thus formed need not be, and preferably are not, secured together. The cover, formed as indicated to a width to be determined by the size and shape of the complete gasket, is formed around the core with the layer of polymeric material, or the inner layer of metallic fabric, when employed as preferred, disposed inwardly. In the preferred embodiment of the invention as illustrated, the cover is wrapped around the core with laterally extending juxtaposed edge portions which are secured together by stitching as indicated at 22, or in any suitable fashion, to form an attaching flange, designated generally by the reference numeral 24.

While the polymeric sealing material may be composed of the various well known resinous materials such as vinyl chloride, vinyl chloride-acetate copolymers, vinylidine chloride, nylon, polyethylene, etc., it is highly preferred to employ for that purpose one of the polytetrahaloethylenes, polytetrafluoroethylene or chlorotrifluoroethylene, which are highly resistant to corrosion and will withstand relatively high temperatures. When the sealing material is composed of these specific materials, it has been found that the thickness of the sheet must not be greater than about .020 inch. or the cover, and the completed gasket, will not possess the requisite flexibility. Polytetrahaloethylene sheets of a thickness of the order stated, and some of the other plastic materials which might be employed as the sealing material for some services, are subject to relatively easy rupture. The outer layer of metal mesh 16 performs an important protective function in preventing the rupture of the underlying plastic sheet, while at the same time having no adverse effect on the flexibility of the cover material. The inner layer of metal mesh 20 performs a somewhat similar function in preventing the plastic material from being impressed into the core through the openings in its outer layer comprising in the preferred embodiment a jacket knitted from metallic strands of a heavier gauge, and more openly knitted than the metal mesh of the inner layer of the cover. Thus, the inner layer acts as a barrier to prevent the plastic material from being compressed through and held in the openings in the outer layer of the core, where it would tend to be held against relative sliding motion on the core and would be subject to tearing or other form of rupture.

A cover material such as described above, when combined with a resilient, flexible, compressible core, produces a highly satisfactory gasket in accordance with the stated objects. By the proper selection of metals or metallic alloys for the metal mesh components of the core and cover, the properties of sealability, sealing effectiveness, resilience, flexibility, and heat- and corrosion-resistance can be greatly enhanced, so that the resulting gasket is capable of withstanding extremely high temperatures over a long service life without having its sealing properties materially affected. Preferred corrosion- and heat-resisting metals or metal alloys which may be employed for the several components to produce these results are Inconel, Monel, or stainless steel.

By combining the preferred gasket cover material and core as described above, all of the properties set forth in the statement of objects, including ready compressibility under relatively light sealing forces, good sealing effectiveness over a long service life in relatively high temperature services, corrosion resistance, high flexibility, and excellent resilience or tendency to recover from compression loads, are obtained.

As explained in the said copending applications, by forming the gasket center of knitted metal mesh having an initial strand diameter and number of courses per inch within the ranges stated, with the convolutions relatively loosely formed upon each other as described, there results a light and flexible, readily compressible center, having excellent recovery characteristics after compression. The lightness, compressibility, and resilience or recovery characteristics of the center are materially improved by crimping the center strip as described. If the center strip is wrapped more tightly upon itself and so as not to leave a central aperture in the convolute form, an increase in fire-resistance and resilience is obtained, but the construction of the center in this alternative fashion results in the loss of a certain amount of the highly desired ready initial compressibility. The use of a knitted metal mesh jacket on the center as described, and particularly a plurality of such jackets, greatly enhances the resilience of the gasket. These jackets, formed generally of a heavier gauge wire and knitted more coarsely than both the center strip, and the mesh components, 16 and 20, of the cover, in fact contribute much of the resilience to the gasket, without detracting adversely from its flexibility.

The flexible polymeric sheet material functions to seal against the passage of fluids, either liquids or gases, and cooperates with the knitted metal mesh components of the cover in the manner described above. From the foregoing description, it will be apparent that the core itself is porous and fluid pervious, so that it is important to protect the fluid impervious polymeric sealing material against rupture. As explained above, this is accomplished by the adjacent layer or layers of preferably knitted metal mesh, which at the same time do not diminish the flexibility, compressibility, or resilience or recovery properties of the total gasket to any objectionable extent, because (1) the strands of the open knitted mesh, being freely slidable on each other to at least a limited extent, as is well known, are thus similarly freely slidable on the polymeric sealing material; (2) the combination of the open knitted metal mesh and the relatively thin sheet of polymeric sealing material makes it possible to avoid using an elastomer filled metal fabric, or the like, as a cover, thus providing for increased flexibility; and (3) the polytetrahaloethylene materials, in particular, which are well known to be relatively inflexible in substantial thickness, can be employed in sheets thin enough to provide flexibility.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. A gasket comprising a resilient, flexible, compressible, open or porous, fluid pervious core, said core having a flexible cover thereon comprising a thin, continuous, rupturable, flexible, fluid-impervious plastic sheet of polymeric sealing material separate from the core and a separate flexible layer of knitted, open metal mesh outwardly of said sheet and in contact therewith and free for at least limited sliding movement with respect thereto, and providing protection for said sheet.

2. A gasket as defined in claim 1, in which said core comprises heat and corrosion resistant components, and said sheet of polymeric sealing material comprises polytetrahaloethylene of a thickness not greater than about .020 inch.

3. A gasket as defined in claim 1, in which said cover comprises further a flexible layer of knitted, open metal mesh disposed inwardly of, and in contact with, said polymeric sealing material, between the latter and said core, and restraining the polymeric sealing material from being impressed into said core.

4. A gasket comprising a flexible, resilient, compressible, open or porous, fluid pervious core having an outermost layer of knitted metal mesh, and a flexible cover thereon comprising inner and outer layers of knitted, open metal mesh and a continuous, flexible fluid-impermeable, rupturable plastic sheet of polymeric sealing material separating said layers and in contact therewith, at least said inner layer having a closer knit than said outer layer of said core, and close enough that said sheet of polymeric sealing material is prevented thereby from being compressed through the openings in said outer layer of said core and ruptured upon relative movement of said core and said cover.

5. A flexible, compressible, resilient gasket having a core comprising, a knitted mesh of hard, flexible metal strands, about 8–20 courses per inch, said strands having an initial diameter within the range of about .003–.008 inch, said mesh being arranged in convolutions forming a relatively soft, compressible, open or porous, fluid pervious, resilient center of said gasket, a jacket surrounding said center comprising at least one, outermost layer of knitted mesh of hard, flexible metal strands, about 4–12 courses per inch, having an initial diameter within the range of about .004–.020 inch, and a flexible cover on said core and in contact with said jacket, said cover comprising inner and outer layers of knitted mesh of flexible metal strands, about 7–18 courses per inch, having an initial diameter within the range of about .003–.010 inch, and a flexible fluid-impermeable sheet of polymeric sealing material between said layers and in contact therewith, the metal mesh of said jacket being of heavier gauge and a more open knit than the metal mesh of said center and the metal mesh of said cover.

6. A gasket as defined in claim 5, in which all of the metallic components are heat and corrosion resistant, and said sheet of polymeric sealing material comprises polytetrahaloethylene of a thickness not greater than about .020 inch.

7. A gasket as defined in claim 5, in which said mesh of said center is a crimped mesh, whereby the open nature, lightness, compressibility, and resilience of the center, comprising the convolutions of the crimped mesh, are enhanced.

References Cited in the file of this patent

UNITED STATES PATENTS

| | | |
|---|---|---|
| 1,533,490 | Wirfs | Apr. 14, 1925 |
| 2,139,780 | Tea | Dec. 13, 1938 |
| 2,250,863 | Goodloe | July 29, 1941 |
| 2,425,293 | McDermott | Aug. 12, 1947 |
| 2,539,329 | Sanders | Jan. 23, 1951 |